United States Patent Office 2,965,543
Patented Dec. 20, 1960

2,965,543

ALCOHOL DETOXIFICATION OF PERTUSSIS VACCINES

Elizabeth H. Thiele, Philadelphia, Pa., assignor to Merck & Co., Inc., Rahway, N.J., a corporation of New Jersey No Drawing. Filed July 3, 1953, Ser. No. 366,072

5 Claims. (Cl. 167—78)

This invention relates to the detoxification of toxins associated with bacterial immunizing antigens. More particularly, it relates to the detoxification of the toxic components present when antigens are obtained from *Hemophilus pertussis*, and hence, is an improved process for preparing an antigen for immunization against whooping cough.

Processes for the production of whooping cough vaccines are known. These vaccines in general consist of suspensions of the whole, dead bacterial cells of *H. pertussis*, which is the bacterial species that is generally recognized as the causative agent of whooping cough. The bacterial cells of this species are known to contain certain antigenic components that are essential for immunization against whooping cough. The cells also contain other components which are highly toxic and contribute little or nothing to immunization. Hence, when vaccines comprised of whole bacterial cells are employed for prophylaxis of whooping cough, the injection of these vaccines is frequently accompanied by evidences of systemic toxicity, such as fever, restlessness, irritability, and malaise, as well as evidences of local toxicity, such as local soreness, erythema, and induration.

One of these toxic components has been identified and it is classically referred to as the thermolabile toxin. It was first described by Evans and Maitland in J. Path. Bact. 45, 715 (1937) and later by them in J. Path. Bact. 48, 67 (1939). It was obtained by them from ground-up bacilli. It was lethal on intravenous injection into guinea-pigs, and produced areas of necrosis on intradermal injection in the rabbit. The toxin was easily destroyed by formalin, was unstable at 37° C., and was rapidly destroyed at 55° C.

The observations by Evans and Maitland have been confirmed and extended by later workers including Flosdorf et al. who reported on it in J. Immunology, 42, 133 (1941). Flosdorf and his colleagues distinguished in *H. pertussis* a feebly antigenic thermostable toxin in addition to the thermolabile toxin of Evans and Maitland. Reference to this is also found in Principles of Bacteriology and Immunity, Topley and Wilson, 3rd ed., vol. 1, pages 802–803.

In accordance with the present invention a whooping cough antigen is produced which is free of the adverse manifestations due to the thermolabile toxin, which has been thought to be unavoidable. This novel process involves the performance of steps which serve to destroy the activity of the heat labile toxin of the preparation while leaving the antigenic components essentially unaffected. Essentially, this process involves contact between the toxin and an alcohol of a special group.

It has not heretofore been realized that the pertussis thermolabile toxins could be detoxified by contact with a suitable alcohol. Flosdorf, in Patent 2,405,740, dated August 13, 1946, mentions the addition of alcohol in the preparation of a pertussis antigen, but this addition was made after the thermolabile toxin had been removed and was made solely for the purpose of precipitating the thermostable toxin.

A report by Pillemer et al. relating to Pertussis Antigens in Science, 106, 36 (1947) refers to the use of alcohol but it is stated that their starting material contained previously detoxified thermolabile toxins. The alcohol could not, therefore, have even inherently exerted a detoxifying effect. In that case the alcohol was used only for the purpose of precipitation to effect a separation of the antigen from other impurities.

Strean has used alcohol as described in Patent 2,371,002, dated March 6, 1945, but it was applied to samples of the toxin after it had been separated from the pertussis antigen, in order to characterize the toxin as a protein. In accordance with the present invention, it is not necessary to separate the toxin from the antigen as it has been found that the alcohol exerts its detoxifying effect in the presence of the antigen without impairing the latter's immunizing properties.

In an article by Cruickshank in the Lancet issue of September 4, 1937 on pages 567 to 570, mention is made of the use of alcohol on preparations that had previously been treated with trypsin. As trypsin destroys the thermolabile toxin, the subsequent addition of alcohol did not exert the detoxifying effect of the invention.

The organisms from which the antigen preparation is made may be grown in or upon any of the conventional culture media capable of supporting the growth of *H. pertussis* organisms containing protective antigen, such as, Bordet gengou agar or liquid culture medium of the type described by Verwey and Sage[1] or Verwey, Thiele, Sage and Schuchard.[2] After a period of growth at approximately 37° C. for a period of 24 to 96 hours, the bacterial cells may be separated from the culture medium in any convenient manner such as by the use of a centrifuge.

The harvested bacterial cells may be resuspended in distilled water, physiological saline solution, or any other convenient diluent not incompatible with the maintenance of the activity of the protective antigen and having a pH in the general range between 5.8 and 8. Cell suspensions having pH's outside of these ranges may be used provided that the conditions employed do not result in the destruction of the antigen. The specific concentration of the cells in the suspension is unimportant. However, satisfactory results are obtained when the cells are suspended to a density ranging between 1,400 B/ml. and 3,000 B/ml.

This concentrated cell suspension is now subjected to a crushing or disintegrating action so as to disrupt or break up the cells. For this purpose any disintegrating process may be used and a preferable procedure is to subject this concentrated cell suspension to sonic vibration. Machines producing sonic energy adequate for this purpose are available and any of the conventional ones may be employed. The period of time required to satisfactorily treat pertussis cells with sonic frequencies around 10,000 cycles per second is approximately 35 minutes. However, shorter periods of exposure may be used and longer periods of exposure up to 90 minutes do not affect the outcome adversely.

The suspensions from the disintegration step are then subjected to a procedure suitable for separating the soluble material from the insoluble cellular debris. This has usually been done by centrifugation. The soluble material following this separation has been found to contain the major portion of the immunizing substance and the toxic components derived from the bacterial cells.

This solution is now subjected to the step which con-

---

[1] 49 J. Bact. 520.
[2] J. Bact. August 1949.

stitutes a major feature of this invention. This involves its mixture with a monohydric aliphatic alcohol, the molecule of which contains from 2 to 4 carbon atoms. The relatively inferior results which are obtained with methyl alcohol make its use inadvisable. Ethyl, propyl, and butyl alcohol may be used or these may be of either straight or branched chain molecular structures. This treatment of the solution and the selected alcohol merely involves their mixture. This procedure has been carried out successfully at room temperature, but it is believed that lower temperatures above the freezing point of the mixture are preferable.

The time for detoxification by alcohol may be as little as ten minutes or as long as 48 hours. The period of contact of the antigen solution with the alcohol does not appear to be critical. The hydrogen ion concentration does not appear to influence the effect of alcohol in destroying the toxicity of the antigen solution. However, extremes of acidity or alkalinity may destroy the antigenic components in the antigen solution. Concentrations of alcohol between 20% and 80% by volume have been employed satisfactorily.

It is realized that because of the large number of factors that may be involved, namely, temperature, alcohol concentration, time and pH, that it is possible to obtain the results contemplated by the invention by working outside of these ranges, if the proper combination of these variable conditions is made, and it is therefore to be understood that the limits that have been set forth define the general conditions to attain satisfactory results. Solutions that have been treated in this manner have been found to maintain essentially all of their original immunizing activity but were unexpectedly found to have become practically devoid of toxicity.

It is realized that there are many ways in which antigen preparations containing both active protective antigen and pertussis toxin may be procured. The important feature of this invention is the contact between the pertussis thermolabile toxin and the alcohol which results in the destruction of the toxin, and the particular time at which the alcohol is added does not appear to be important. Thus, the feature of prime importance is that the alcohol be in contact with pertussis toxin when this toxin is free from the bacterial cells. Therefore, the alcohol could be added before disintegration or extraction of the antigen has taken place if this procedure should be more convenient in some instances.

This alcohol treated antigen solution may then be carried through any of the applicable steps known in the art of biochemical purification that may be indicated either for the preparation of a relatively crude detoxified antigen or for further purification leading to the elimination of unessential impurities.

In the further treating of this detoxified antigen solution, methods which are commonly used are the precipitation of the antigen by means of alum, or its isoelectric precipitation by the addition of mineral acids. The precipitate can then be separated out, and the antigen may be either resuspended or redissolved in a suitable isotonic buffer solution. The material can then be adjusted to suitable strength for immunization.

All of the steps described in this application may be carried out at room temperature or higher but because of the recognized lability of biological substances, it is believed to be advantageous to maintain the material under refrigeration whenever convenient in order to retard the normal rate of loss of antigenic activity.

Antigen preparations that have been treated with alcohol as described above have been injected into mice to measure the residual toxicity. It was found that less than 10% of the toxicity of the original untreated antigenic solution remained.

When such an antigenic preparation is made equivalent in mouse protective potency to pertussis vaccine and injected into children, the antibody response that is elicited is equal or superior to that produced by the pertussis vaccine, however without any of the usual toxic manifestations. As a matter of fact, it has been found that doses two or more times greater than this equivalent dose can be injected still with no evidences of either local or systemic toxicity. This is a surprising result because even the usual doses of pertussis vaccine are prone to produce toxis reactions to a greater or lesser extent in almost all cases.

The invention will further be explained by the following examples:

EXAMPLE I

A smooth strain of *H. pertussis* No. 2227 was grown for 48 hours at 37° C. in a casein hydrolysate base medium by the methods described by Verwey, Thiele, Sage, and Schuchardt in the Journal of Bacteriology, August 1949. The entire material was centrifuged in a Sharples type centrifuge at 30,000 r.p.m. and at flow rate of 20 liters per hour. The pertussis cells were removed from the bowl of the centrifuge and re-suspended in distilled water to a final concentration of 2,280 B cells per ml. This concentrated cell suspension was shaken to promote uniform dispersion and treated in a Raytheon Company sonic oscillator Type R 22–1 in 30 cc. aliquots for 35 minutes each. The aliquots were re-combined and centrifuged in an International No. 2 centrifuge for 6 hours in the cold to sediment insoluble cell residue.

Following this centrifugation the supernatant is collected by siphoning, and diluted to a concentration of 2 mg. of nitrogen per ml. with distilled water. This proteinatious solution is then chilled to +2 to 5° C. and anhydrous ethanol previously cooled to a temperature of −50° C. is added slowly with stirring to produce a final alcohol concentration of 40%. Alcohol treatment was permitted to go on for 24 hours at −10° C., after which time the material was removed to a +2 to 5° C. room and diluted by the addition of distilled water to give a final alcohol concentration of 4%. A 10% by weight solution of potassium alum is added to give a final concentration of 1%. This addition results in the formation of a flocculent precipitate. This precipitate is allowed to settle over night at room temperature and the supernatant is siphoned off. The precipitate is washed by resuspending in distilled water to twice the original volume of the antigen solution prior to the addition of the alcohol. After a further 24 hours for the precipitate to re-settle, the supernatant is again siphoned off and resuspended with isotonic phosphate buffer at pH 7.4 to the original volume of the antigen solution. Samples were taken at each significant step in the process and the amount of toxicity as measured by mouse toxicity assay in these materials is as follows:

|  | Dilution for LD 50 | Reduction in percent |
|---|---|---|
| Antigenic solution before alcohol administration | 1:900 |  |
| Antigenic solution after alcohol administration | <1:20 | 97 |
| Antigenic solution after alcohol administration and precipitation by alum | <1:6 | 99 |

EXAMPLE II

The procedure set forth in Example I was carried up to the addition of the ethanol, but this time isopropyl alcohol was used. Enough isopropyl alcohol was added in the same manner as in Example I to give a final concentration of 40%. The alcoholic mixture was allowed to stand 24 hours at −10° C. and it was then diluted with .3 M phosphate buffer to a final alcohol concentration of 4%. Toxicity tests showed that the toxicity of the antigenic solution had been reduced 97%.

EXAMPLE III

The same procedure was followed as in Example II with the exception that butyl alcohol was substituted for the isopropyl alcohol. Toxicity tests showed that the antigenic solution had been effectively detoxified in that here again the toxic reactions had been reduced 97%.

EXAMPLE IV

The same procedure was followed as for Examples II and III, but instead of using isopropyl or butyl alcohol for detoxification, propyl alcohol was used. 97% of the toxicity of the parent material was shown to have been eliminated.

EXAMPLE V

In this case the procedure of Example I was followed up to the dilution of the antigenic supernatants and then instead of a 2 mg. of N/ml. solution, I diluted so as to use a .2 mg. of N/ml. solution. The pH was adjusted to 4.0 and ethanol was added to give a final concentration of 30%. In this example a precipitate was formed by the H+ adjustment. Therefore, the precipitate was resuspended in .3 M phosphate buffer. Toxicity tests of the antigenic suspension showed an 87% reduction of the toxic reaction.

To show the utility of the invention, an antigen prepared by the described method was tested in groups of children in comparison with the classical type of pertussis vaccine. Both of these antigens had been adjusted to approximately equivalent antigenic potency on the basis of mouse protection tests of the type recommended by the National Institutes of Health of the United States Public Health Service. In addition, a group of non-immunized children were selected at random as controls. The children in one group were immunized with the antigen prepared according to the procedure in the invention, and children in the other immunized group were immunized according to standard pediatrics procedure. All children were observed for some months to determine frequency of which whooping cough developed among children of the various groups. Results of this observation are given in the following table:

*Frequency of clinical pertussis*

| Type of comparison | Alcohol detoxified Antigen | Control Vaccine | Non-Immunized |
|---|---|---|---|
| Number of children | 137 | 128 | 153 |
| Child-months of risk for pertussis | 1,794 | 1,797 | 2,040 |
| Number of cases of pertussis | 1 | 1 | 10 |
| Cases per 1,000 months of risk | 0.557 | 0.556 | 4.900 |
| Non-immunized/immunized | 8.8 | 8.8 | |
| Statistical significance | $p=<0.01$ | $p=<0.01$ | |

The data in this table demonstrate that the antigen prepared by the method described herein was equally efficacious as the classical pertussis vaccine. Other observations concerning the frequency of reaction that occurred following vaccination indicated that the detoxified pertussis antigen produced reactions to a significantly lesser extent than did the classical pertussis vaccine. Blood samples obtained from children in the two immunized groups were analyzed for their agglutinin antibody content, and it was found that the pertussis agglutinin titers in the group receiving the detoxified antigen averaged fourfold greater than those found in blood samples from the children immunized with the classical pertussis vaccine.

This application is a continuation-in-part of my co-pending application Serial No. 101,924, filed June 28, 1949, now abandoned, entitled Whooping Cough Immunization Antigen.

What is claimed is:
1. A process for the detoxification of the pertussis thermolabile toxin in a solution containing both said toxin and the protective antigen of *H. pertussis*, which comprises its contact for from 10 minutes to 48 hours with a monohydric aliphatic alcohol having from 2 to 4 carbon atoms in its molecule under refrigerated conditions above its freezing point, the alcohol concentration being from 20 to 80% by volume.

2. A process for the production of an antigen for immunization against whooping cough which comprises disintegration of *H. pertussis* cells, separation of the solids to discard, and contact of the recovered liquid which contains both the pertussis thermolabile toxin and the protective antigen of *H. pertussis* with a monohydric aliphatic alcohol having 2 to 4 carbon atoms in its molecule for a period of 10 minutes to 48 hours, the alcohol concentration being from 20 to 80% by volume.

3. A process for the production of an antigen for immunization against whooping cough which comprises disintegration of *H. pertussis* cells, contact of the product containing both the pertussis thermolabile toxin and the protective antigen of *H. pertussis* with a monohydric aliphatic alcohol having 2 to 4 carbon atoms in its molecule for a period of 10 minutes to 48 hours, the alcohol concentration being from 20 to 80% by volume, and separation of the antigen from the impurities.

4. A process according to claim 3 in which the alcohol is ethanol.

5. A process for the detoxification of the pertussis thermolabile toxin of *H. pertussis* in a solution containing both said pertussis toxin and the protective antigen of *H. pertussis*, which comprises contact of the toxin of the pertussis cells with ethanol for a period of 10 minutes to 48 hours, the alcohol concentration being from 20 to 80% by volume.

References Cited in the file of this patent

UNITED STATES PATENTS

| | | |
|---|---|---|
| 2,371,002 | Strean | Mar. 6, 1945 |
| 2,405,740 | Flosdorf | Aug. 13, 1946 |

FOREIGN PATENTS

| | | |
|---|---|---|
| 527,803 | Great Britain | Oct. 16, 1940 |

OTHER REFERENCES

Leonard: "Purification of Diphtheria Toxoid" in J. Infect. Dis., 1933, vol. 53, pp. 376–385.

Cruickshank in the Lancet, Sept. 4, 1937, pp. 567–570.

Eldering in Am. J. Hygiene, 34, Sec. B, July 1941, pp. 1–7.

Pillemer: "Separation and Immonologic Evaluation of Soluble Pertussal Antigens" in Science, vol. 106, No. 2741, July 11, 1947, pp. 571–585.

Felton in JAMA, September 30, 1944, pp. 294–299.

Chem. Abst., vol. 28, p. 7290, 1934.

Chem. Abst., vol. 30, p. 3015, 1949.

Pillemer: Science, vol. 108, p. 311 (1948).

Pillemer: Proc. Soc. Exp. Biol. and Med., pp. 75–78, 1950.

Hawk et al.: "Practical Physiological Chem.," p. 163, 1947 by Blakiston Co., Philadelphia, Pa.